(12) United States Patent
Yamada et al.

(10) Patent No.: US 12,224,437 B2
(45) Date of Patent: Feb. 11, 2025

(54) METHOD OF PRODUCING A SECONDARY BATTERY, AND SECONDARY BATTERY

(71) Applicant: KABUSHIKI KAISHA TOSHIBA, Tokyo (JP)

(72) Inventors: Arisa Yamada, Kawasaki (JP); Tomoe Kusama, Tokyo (JP); Tomoko Sugizaki, Kawasaki (JP); Yuta Kanai, Tokyo (JP); Hirofumi Yasumiishi, Kawasaki (JP); Tetsuya Sasakawa, Yokohama (JP); Yasuhiro Harada, Isehara (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 577 days.

(21) Appl. No.: 17/668,475

(22) Filed: Feb. 10, 2022

(65) Prior Publication Data

US 2022/0344655 A1    Oct. 27, 2022

(30) Foreign Application Priority Data

Apr. 27, 2021   (JP) .................. 2021-075083

(51) Int. Cl.
*H01M 4/525*   (2010.01)
*H01M 4/02*    (2006.01)
(Continued)

(52) U.S. Cl.
CPC ......... *H01M 4/525* (2013.01); *H01M 4/0471* (2013.01); *H01M 4/131* (2013.01); *H01M 4/134* (2013.01); *H01M 4/1391* (2013.01); *H01M 4/1395* (2013.01); *H01M 10/0525* (2013.01); *H01M 2004/027* (2013.01); *H01M 2004/028* (2013.01); *H01M 2300/0037* (2013.01)

(58) Field of Classification Search
CPC .... H01M 4/525; H01M 4/0471; H01M 4/131; H01M 4/1391; H01M 4/505;
(Continued)

(56) References Cited

U.S. PATENT DOCUMENTS

| | | | |
|---|---|---|---|
| 2008/0176142 A1 | 7/2008 | Inagaki et al. | |
| 2014/0120380 A1* | 5/2014 | Inagaki ................. | H01M 4/485 429/231.95 |

(Continued)

FOREIGN PATENT DOCUMENTS

| | | |
|---|---|---|
| JP | 2007-273260 A | 10/2007 |
| JP | 2008-041402 A | 2/2008 |

(Continued)

*Primary Examiner* — Matthew W Van Oudenaren
(74) *Attorney, Agent, or Firm* — Oblon, McClelland, Maier & Neustadt, L.L.P.

(57) ABSTRACT

According to one embodiment, a method of producing a secondary battery is provided. The method includes preparing a battery architecture including a positive electrode, a negative electrode, and an electrolyte; adjusting a positive electrode potential to a range of 3.4 V to 3.9 V and a negative electrode potential to a range of 1.5 V to 2.0 V based on an oxidation-reduction potential of lithium, thereby providing a potential adjusted state; and holding the battery architecture in the potential adjusted state at a holding temperature of 50° C. to 90° C. The positive electrode includes a lithium-nickel-cobalt-manganese composite oxide. The negative electrode includes a niobium-titanium composite oxide. The electrolyte includes one or more first organic solvent having a viscosity of 1 cP or less.

10 Claims, 4 Drawing Sheets

(51) Int. Cl.
*H01M 4/04* (2006.01)
*H01M 4/131* (2010.01)
*H01M 4/134* (2010.01)
*H01M 4/1391* (2010.01)
*H01M 4/1395* (2010.01)
*H01M 10/0525* (2010.01)

(58) Field of Classification Search
CPC ......... H01M 10/0525; H01M 10/0569; H01M 10/42; H01M 10/446; H01M 10/44; H01M 10/441; H01M 2004/027; H01M 2004/028; H01M 2300/0037
See application file for complete search history.

(56) References Cited

U.S. PATENT DOCUMENTS

| | | |
|---|---|---|
| 2014/0272604 A1 | 9/2014 | Lim et al. |
| 2016/0204432 A1* | 7/2016 | Koshiba .............. H01M 4/5825 29/623.2 |
| 2016/0261006 A1* | 9/2016 | Ueno ................ H01M 10/0569 |
| 2021/0288306 A1 | 9/2021 | Fukaya et al. |

FOREIGN PATENT DOCUMENTS

| | | |
|---|---|---|
| JP | 2015-522209 A | 8/2015 |
| JP | 2017-134997 A | 8/2017 |
| JP | 2021-144819 A | 9/2021 |
| WO | WO 2020/184690 A1 | 9/2020 |

* cited by examiner

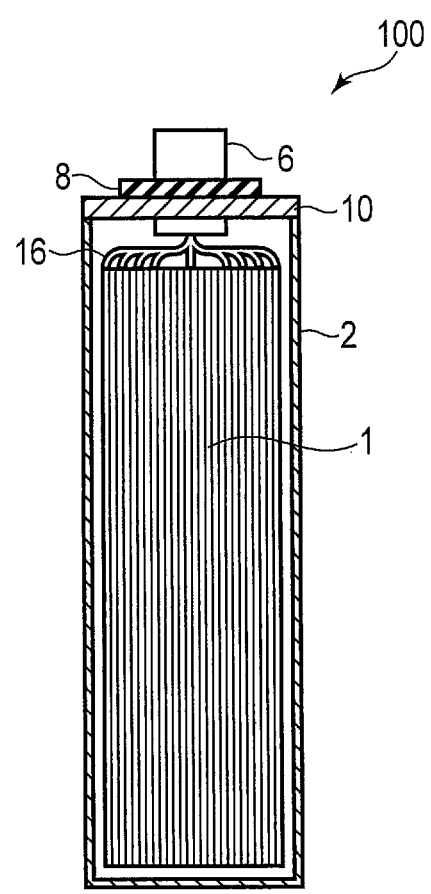
F I G. 6

METHOD OF PRODUCING A SECONDARY BATTERY, AND SECONDARY BATTERY

CROSS-REFERENCE TO RELATED APPLICATIONS

This application is based upon and claims the benefit of priority from Japanese Patent Application No. 2021-075083, filed Apr. 27, 2021, the entire contents of which are incorporated herein by reference.

FIELD

Embodiments described herein relate generally to a method of producing a secondary battery, and a secondary battery.

BACKGROUND

Recently, secondary batteries, such as a nonaqueous electrolyte secondary battery like a lithium ion secondary battery, have been actively researched and developed as a high energy-density battery. The secondary batteries, such as a nonaqueous electrolyte secondary battery, are anticipated as a power source for vehicles such as hybrid electric automobiles, electric cars, an uninterruptible power supply for base stations for portable telephones, or the like. Therefore, the secondary battery is demanded to, in addition to having a high energy density, be excellent in other performances such as rapid charge-discharge performances and long-term reliability, as well.

Commercialized nonaqueous electrolyte secondary batteries include, for example, a secondary battery that uses a lithium-transition metal composite oxide containing Co, Mn, Ni, or the like as a positive electrode active material, and a carbonaceous material or a titanium-containing oxide as a negative electrode active material.

When moisture is included in a nonaqueous electrolyte secondary battery, gas generation derived from the moisture may occur during operation of the battery. Examples of the gas derived from moisture include hydrogen and oxygen. When a large amount of gas is generated in the battery, battery swelling occurs. In addition, when gas is present on the surface of an electrode active material, the portion of the surface is not in contact with the nonaqueous electrolyte, and therefore the electrode reaction field is reduced. As a result, the current load at the remaining electrode interface increases, and thus the battery resistance increases.

In order to remove moisture in producing the nonaqueous electrolyte secondary battery, for example, there are performed treatments such as heating and drying before introducing the electrolyte into the battery container, and producing the battery under environmental conditions with little moisture such as an environment with a low dew point. Despite of such treatment, moisture may remain in the battery container or a trace amount of moisture may be mixed into the nonaqueous electrolyte.

As a means for preventing gas generation derived from residual moisture from occurring during use of the battery, charge-and-discharge and aging treatments are performed in advance during the production of the battery, and the resultant gas generated is removed. For example, the battery container is temporarily sealed, is charged to a predetermined charge state (State Of Charge: SOC), is subjected to aging of holding in the charged state under a specified temperature environment for a certain period of time, then the temporary sealing is opened under a vacuum environment to release the gas generated during aging, then resealed fully.

In addition, depending on the battery configuration such as the electrolyte composition or aging conditions, a coating maybe formed at the electrode. It is known that as the secondary battery is repeatedly used, the positive electrode active material or the negative electrode active material is deteriorated, whereby there is progression in deterioration of the secondary battery such as a decrease in capacity. One example of causes of the deterioration include the reaction between the active material and an electrolytic solution (liquid electrolyte). A technique of forming the above coating, for example, forming the coating on the surface of the active material is known, whereby the coating prevents the decomposition (side reaction) of the electrolytic solution to thereby suppress the deterioration of the battery characteristics.

BRIEF DESCRIPTION OF THE DRAWINGS

FIG. 6 is a schematic cross-sectional view along line VI-VI of the battery architecture shown in FIG. 5.

DETAILED DESCRIPTION

Figure 1:
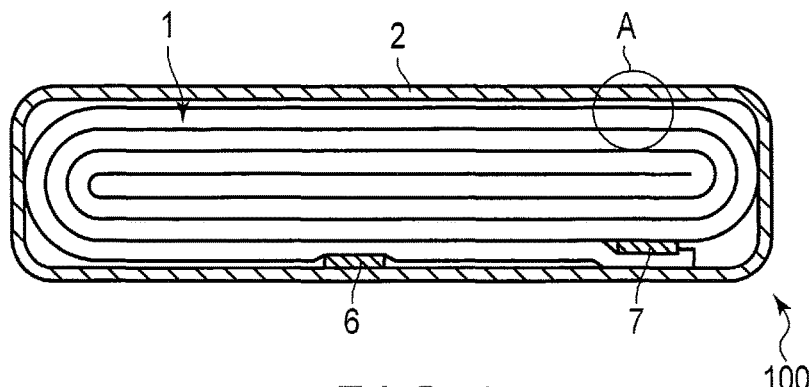
FIG. 1 is a cross-sectional view schematically illustrating an example of a battery architecture according to an embodiment.

According to one embodiment, a method of producing a secondary battery is provided. The method includes preparing a battery architecture including a positive electrode, a negative electrode, and an electrolyte; adjusting a positive electrode potential of the positive electrode to a range of 3.4 V or more and 3.9 V or less based on oxidation-reduction potential of lithium, and adjusting a negative electrode potential of the negative electrode to a range of 1.5 V or more and 2.0 V or less based on oxidation-reduction potential of lithium, thereby providing a potential adjusted state; and holding the battery architecture in the potential adjusted state at a holding temperature in a range of 50° C. or more and 90° C. or less. The positive electrode includes a lithium-nickel-cobalt-manganese composite oxide. The negative electrode includes a niobium-titanium composite oxide. The electrolyte includes one or more of first organic solvents having a viscosity of 1 cP or less.

According to another embodiment, a secondary battery, which is produced by the production method according to the above embodiment, is provided.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, a production method for a secondary battery is provided. The method includes preparing a battery architecture, obtaining a potential adjusted state, and holding the battery architecture in the potential adjusted state at a holding temperature within a range of 50° C. to 90° C. The battery architecture includes a positive electrode, a negative electrode, and an electrolyte. The positive electrode includes a lithium-nickel-cobalt-manganese composite oxide. The negative electrode includes a niobium-titanium composite oxide. The electrolyte includes one or more first organic solvent having a viscosity (η) of 1 cP or less. The potential adjusted state is obtained by adjusting a positive electrode potential of the positive electrode to a range of 3.4 V to 3.9 V with the oxidation-reduction potential of lithium as reference, and adjusting a negative electrode potential of the negative electrode to a range of 1.5 V to 2.0 V with the oxidation-reduction potential of lithium as reference.

Examples of a means for improving the output performance under low temperature conditions include increasing the amount of the low-viscosity solvent included in an electrolyte. Examples of the low-viscosity solvent include propionic acid esters such as ethyl propionate (EP) and methyl ethyl carbonate (MEC). However, EP and MEC are sensitive to heat. Therefore, when the proportion of EP or MEC increases, for example, gas generation easily occurs in a high temperature environment of about 70° C. to 80° C. For example, an onboard battery installed in a vehicle such as an electric vehicle, a hybrid electric vehicle, or a railway car is required to exhibit good performance in both low temperature and high temperature environments.

The battery including EP and MEC may be subjected to aging treatment, thereby significantly reducing the gas amount. On the contrary, however, an increase in battery resistance was observed when the aging treatment was performed. As a result of intensive investigation by the present inventors, it has been found that the battery resistance increases when aging is performed in a high charging state (State Of Charge: SOC), for example, under the condition of SOC 100%. In contrast, it has been found that an increase in resistance is suppressed by performing aging at a low SOC. The above-described tendency in aging, where an increase in resistance is observed at a high SOC and an increase in resistance is reduced at a low SOC, does not depend on an additive to the electrolyte. Therefore, the decomposition of a fragile solvent such as EP or MEC under a high SOC condition is considered a cause of increase in resistance.

The method of producing a secondary battery according to the first embodiment includes holding a battery architecture having an electrolyte including a first organic solvent having a low viscosity η of 1 cP or less, at a holding temperature in the range specified above, in a potential adjusted state where the positive electrode potential is adjusted to 3.4 V or more and 3.9 V or less (vs. Li/Li+) based on the oxidation-reduction potential of lithium and the negative electrode potential is adjusted to 1.5 V or more and 2.0 V or less (vs. Li/Li+). The battery architecture corresponds to a precursor of the secondary battery. The treatment of holding the battery architecture in the potential adjusted state at the holding temperature corresponds to so-called aging. In addition, the potential adjusted state corresponds to a low state of charge (SOC) of a battery in which the positive electrode includes a lithium-nickel-cobalt-manganese composite oxide as an active material and the negative electrode includes a niobium-titanium composite oxide as an active material. That is, the method of producing a secondary battery includes performing aging under a low SOC condition. Aging at low SOC can suppress decomposition of the first organic solvent including EP or MEC. This can suppress gas generation and an increase in battery resistance during use of the battery. A battery having low battery resistance can exhibit high output performance. Even when the battery produced by such a production method is repeatedly subjected to the charge-and-discharge cycle under a high temperature (for example, about 70° C. to 80° C.) condition, gas generation can be suppressed to a small extent.

Therefore, the production method according to the first embodiment can produce a secondary battery that exhibits high output performance from a low temperature to a high temperature and is excellent in life performance even under a high temperature condition.

A step of adjusting the positive electrode potential and the negative electrode potential to the above ranges to obtain a potential adjusted state, and a step of holding the battery architecture at the holding temperature in the potential adjusted state may be collectively referred to as "pretreatment" for the secondary battery produced by the production method according to the first embodiment. This pretreatment generates gas in advance in the production stage of the secondary battery, thereby reducing an amount of gas that may be generated when a battery is used. The gas generated in advance by the pretreatment is removed before the secondary battery production is completed. For example, the gas generated during the pretreatment includes gas derived from residual moisture (for example, hydrogen or oxygen). Therefore, the residual moisture can be reduced by performing degassing after the pretreatment. Details of the degassing will be described later.

The battery architecture adjusted to the potential adjusted state is held at a holding temperature of 50° C. or more and 90° C. or less. Setting the holding temperature to 50° C. or more can promote a reaction of generating gas in advance during the pretreatment. Setting the holding temperature to 90° C. or less can suppress excessive decomposition of the first organic solvent, and therefore an increase in battery resistance can be suppressed.

The time for holding the battery architecture at the holding temperature is preferably 6 hours or more and 72 hours or less. Holding the secondary battery for 6 hours or more can further reduce the amount of gas generated during use of the secondary battery. Setting the upper limit of the holding time to 72 hours can avoid excessive decomposition of electrolyte components such as the first organic solvent.

The battery architecture includes a positive electrode, a negative electrode, and an electrolyte. Respective details of the positive electrode, negative electrode, and electrolyte will be described later. The battery architecture may further include a separator disposed between the positive electrode and the negative electrode. The negative electrode, positive electrode, and separator may configure an electrode group. The electrolyte may be held in the electrode group.

In addition, the battery architecture may further include a container member housing the electrode group and the electrolyte.

Furthermore, the battery architecture may further include a negative electrode terminal electrically connected to the negative electrode and a positive electrode terminal electrically connected to the positive electrode.

The battery architecture can be prepared, for example, by housing a positive electrode, a negative electrode, and an electrolyte in a container member. A method of producing the positive electrode, a method of producing the negative electrode, and a method of adjusting the electrolyte will be described later. It is desirable to prepare the battery architecture under an inert atmosphere. In addition, it is desirable to prepare the battery architecture under a dry environment. Adopting an inert atmosphere or a dry environment can avoid, potential gas sources like oxygen, carbon dioxide, and hydrogen. Production of the positive and negative electrodes and adjustment of the electrolyte are also desirably performed in an inert atmosphere and a dry environment. Examples of the inert atmosphere include an argon atmosphere.

An aspect of the electrode group is not particularly limited, and the electrode group may have, for example, a wound structure or a stacked structure.

The electrode group having a wound structure can be fabricated, for example, as follows. The positive electrode and the negative electrode are stacked with the separator interposed therebetween to obtain a stack of the positive electrode, the negative electrode, and the separator. The stack is wound, and then the obtained wound body is further pressed, whereby a flat-shaped wound electrode group can be fabricated.

The electrode group having a stacked structure can be fabricated, for example, by stacking positive electrodes, negative electrodes, and separator(s) such that the separator(s) is interposed between the positive electrode and the negative electrode. Herein, plural separators may be arranged between the positive electrodes and the negative electrodes, or one separator may be folded, for example, in zigzag, and the positive electrodes and the negative electrodes may be alternately arranged in spaces formed by fold-backs of the separator.

The electrode group and an electrolyte are placed in a container member, and temporary sealing is performed to produce a battery architecture. Although details will be described later, for example, a container including a laminate film or a metal container may be used as the container member. Details of the container member will be described later.

When using a container member made of a laminate film, temporary sealing can be performed by, for example, closing an opening by thermal fusion. In temporary sealing, for example, a position further outward from a position where full sealing is to be performed for the secondary battery as a finished product (a position closer to the opening end portion) is closed by thermal fusion.

When the metal container is used as the container member, temporary sealing can be performed, for example, by closing an injection port for introducing the electrolyte, provided outside the container, with a sealing plug. The injection port can be provided, for example, in a lid body of the metal container such as a sealing plate. For example, a liquid electrolyte is put into the metal container through the injection port, and then a rubber plug is attached to the injection port to perform temporary sealing.

The aspect of performing temporary sealing is not limited to the above example.

Adjustment of the positive and negative electrode potentials to the potential adjusted state can be performed, for example, by subjecting the temporarily sealed battery architecture to initial charge-and-discharge. Charge and discharge are performed so that an appropriate state of charge (SOC) is obtained, so as to bring the potential of each of the positive electrode and the negative electrode into the above-mentioned potential ranges in the potential adjusted state. The SOC can be adjusted based on, for example, the battery voltage. Initial charge-and-discharge is performed to an appropriate SOC according to the active material used for each of the positive electrode and the negative electrode and the design of each electrode, to thereby bring the battery architecture into the potential adjusted state. For example, in the battery architecture (or the secondary battery) that includes a positive electrode using a lithium-nickel-cobalt-manganese composite oxide represented by $LiNi_{0.5}Co_{0.3}Mn_{0.2}O_2$ as a positive electrode active material and a negative electrode using $Nb_2TiO_7$ as a negative electrode active material, and is produced such that the charge capacity of the active material of the positive and negative electrodes would be positive electrode:negative electrode=1:1, at a battery voltage of 1.8 V, the positive electrode potential is 3.65 V (vs. Li/Li+) and the negative electrode potential is 1.85 V (vs. Li/Li+), and under this condition, the SOC is 10%. The battery architecture may be brought into the potential adjusted state by initial charge, or the battery architecture may be brought into the potential adjusted state, for example, by initial discharge after initial charge to a full charge state (SOC 100%).

Alternatively, before assembling the battery architecture, a potential adjusted state can be obtained by performing charge-and-discharge for each of the positive electrode and the negative electrode, individually. For example, a positive electrode and a counter electrode made of lithium metal may be used to assemble a battery (e.g., a half cell), thereby allowing adjustment of the positive electrode potential. In a similar manner, for example, a negative electrode and a counter electrode made of lithium metal may be used to assemble a battery (e.g., a half cell), thereby allowing adjustment of the negative electrode potential. The positive electrode and the negative electrode with the potential thereof adjusted respectively are used to produce a battery architecture, whereby a battery architecture in a potential adjusted state can be provided.

Charge-and-discharge for obtaining the potential adjusted state is performed, for example, at room temperature (for example, about 25° C.).

The battery architecture adjusted to the potential adjusted state is held at a holding temperature of 50° C. or more and 90° C. or less. For example, the battery architecture adjusted to the potential adjusted state is placed in the thermostatic bath set to a temperature of 50° C. or more and 90° C. or less. For the purpose of managing and controlling the holding temperature, a temperature sensor may be connected to the surface of the battery architecture. After a set period of time, the battery architecture is taken out from the thermostatic bath and is cooled to, for example, room temperature.

The temporary seal is opened, and the gas generated by the pretreatment is released. After degassing, the container member is fully sealed to provide a secondary battery. For example, the battery architecture taken out from the thermostatic bath is cooled to room temperature, then the battery architecture is placed in an inert atmosphere, and the temporary sealing is opened. The container member is fully sealed under a reduced pressure environment, whereby a secondary battery can be provided. Alternatively, the temporary sealing may be opened under a reduced pressure environment, and then the container member is fully sealed to thereby provide a secondary battery. The reduced pressure environment herein refers to, for example, a vacuum state of about −90 kPa.

When a container member made of a laminate film is used, opening the sealing can be performed, for example, by cutting open the container member at the position where temporary sealing was performed, or by cutting away the portion of the container member where temporary sealing was performed. The full sealing of the container member made of laminate film can be performed, for example, by closing the opening, which had resulted from opening of the seal, by thermal fusion. The full sealing of the container member is desirably performed at a position further inside from the position where the temporary sealing was performed (a position farther from the opening end portion).

When the metal container is used as the container member, for example, the sealing plug used for temporary sealing may be removed to open the seal. The metal container can be fully sealed, for example, by welding a sealing plug made of a material capable of being welded to the container to the opening (for example, an electrolyte injection port) that had resulted from unplugging.

After the treatment of holding the secondary battery at the holding temperature, charge-and-discharge may be performed to adjust the secondary battery to the state of charge for shipment. Charge-and-discharge to the shipment state may be performed, for example, before opening the temporary sealing and degassing, or may be performed after fully sealing the secondary battery. In addition, after full sealing, capacity examination by charge-and-discharge of the secondary battery for quality examination as a product, or break-in charge-and-discharge of the secondary battery may also be performed.

A specific example will be described. Herein, there will be described an example in which a laminate pack made of a laminate film is used as a container member.

An electrode group is produced using a positive electrode and a negative electrode, and the electrode group is housed in the laminate pack. The electrolyte is injected into the laminate pack under an argon atmosphere, and then temporary sealing is performed by thermal fusion under reduced pressure. The potentials of the positive and negative electrodes are adjusted by performing initial charge-and-discharge and setting the battery voltage to a predetermined voltage. The battery architecture whose electrode potential has been adjusted is placed in a thermostatic bath at a predetermined temperature, taken out from the thermostatic bath after a set period of time, placed again in an argon atmosphere, the upper part of the laminate pack is opened, and thermally fused again at a portion closer to the inner side under reduced pressure to perform full sealing.

Hereinafter, the positive electrode, the negative electrode, the electrolyte, the separator, the container member, the negative electrode terminal, and the positive electrode terminal will be described in detail.

(1) Positive Electrode

The positive electrode includes a lithium-nickel-cobalt-manganese composite oxide as a positive electrode active material. The positive electrode may include a positive electrode active material-containing layer containing the positive electrode active material. The positive electrode may further include a positive electrode current collector.

The positive electrode active material-containing layer may be formed on one face or both the front and reverse faces of the positive electrode current collector. The positive electrode active material-containing layer may optionally contain an electro-conductive agent and a binder, in addition to the positive electrode active material.

Specific examples of the above-described lithium-nickel-cobalt-manganese composite oxide include a compound represented by $Li_xNi_{1-y-z}Co_yMn_zO_2$. Herein, $0<x\leq1$, $0<y<1$, $0<z<1$, and $y+z<1$. The positive electrode active material may include one composition of the lithium-nickel-cobalt-manganese composite oxide singly, or may include a combination of two or more compositions thereof.

The positive electrode active material may further include another compound in addition to the lithium-nickel-cobalt-manganese composite oxide. Herein, for convenience, the lithium-nickel-cobalt-manganese composite oxide is referred to as a first positive electrode active material, and another compound as a positive electrode active material is referred to as a second positive electrode active material. The positive electrode active material may include one or more of the first positive electrode active materials and one second positive electrode active material in combination, or may include one or more of the first positive electrode active materials and two or more of second positive electrode active materials in combination. The positive electrode active material includes the first positive electrode active material (the lithium-nickel-cobalt-manganese composite oxide) in a proportion of, for example, 70% by mass or more, and preferably 90% by mass or more. The positive electrode active material may also include only the first positive electrode active material (the lithium-nickel-cobalt-manganese composite oxide).

Examples of the second positive electrode active material include manganese dioxides ($MnO_2$), iron oxides, copper oxides, nickel oxides, lithium manganese composite oxides (e.g., a compound represented by $Li_xMn_2O_4$ or $Li_xMn_2$, wherein $0<x\leq1$), lithium nickel composite oxides (e.g., a compound represented by $Li_xNiO_2$, wherein $0<x\leq1$), lithium cobalt composite oxides (e.g., a compound represented by $Li_xCoO_2$, wherein $0<x\leq1$), lithium nickel cobalt composite oxides (e.g., a compound represented by $Li_xNi_{1-y}Co_yO_2$, wherein $0<x\leq1$ and $0<y<1$), lithium manganese cobalt composite oxides (e.g., a compound represented by $Li_xMn_yCo_{1-y}O_2$, wherein $0<x\leq1$ and $0<y<1$), lithium manganese nickel composite oxides having a spinel structure (e.g., a compound represented by $Li_xMn_{2-w}Ni_wO_4$, wherein $0<x\leq1$ and $0<w<2$), lithium phosphates having an olivine structure (e.g., a compound represented by $Li_xFePO_4$, wherein $0<x\leq1$; a compound represented by $Li_xFe_{1-y}Mn_yPO_4$, wherein $0<x\leq1$ and $0<y\leq1$; and a compound represented by $Li_xCoPO_4$, wherein $0<x\leq1$), iron sulfates ($Fe_2(SO_4)_3$), and vanadium oxides (e.g., $V_2O_5$).

When a room temperature molten salt is used as the electrolyte of the battery, it is preferable to use a positive electrode active material including lithium iron phosphate, a compound represented by $Li_vVPO_4F$ wherein $0\leq v\leq1$, lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The primary particle diameter of the positive electrode active material is preferably from 100 nm to 10 μm. The positive electrode active material having a primary particle size of 100 nm or more is easy to handle during industrial production. In the positive electrode active material having a primary particle size of 10 μm or less, in-solid diffusion of lithium ions can proceed smoothly.

The specific surface area of the positive electrode active material is preferably from 0.1 m²/g to 10 m²/g. The positive electrode active material having a specific surface area of 0.1 m²/g or more can secure sufficient sites for inserting and extracting Li ions. The positive electrode active material having a specific surface area of 10 m²/g or less is easy to handle during industrial production, and can secure a good charge-discharge cycle performance.

Here, for the measurement of the specific surface area, a method is used by which molecules, for which an occupied area in adsorption is known, are adsorbed onto the surface of powder particles at a temperature of liquid nitrogen, and the specific surface area of the sample is determined from the amount of adsorbed molecules. The most commonly used is the BET method based on low-temperature and low-humidity physical adsorption of an inert gas. The BET method is based on the BET theory, which is the most famous theory as a method of calculating the specific surface area where the Langmuir theory, which is a monomolecular layer adsorption theory, has been extended to multi-molecular layer adsorption. The specific surface area determined by the above method is referred to as a "BET specific surface area".

The electro-conductive agent is added to enhance the current collection performance of the positive electrode active material and to suppress contact resistance between the positive electrode active material and the positive electrode current collector. Examples of the electro-conductive agent include acetylene black, carbon black, graphite, carbon fibers, graphene, carbon nanotubes, carbon nanofibers, and fullerenes. One of these may be used as the electro-conductive agent, or alternatively, two or more may be used in combination as the electro-conductive agent. The electro-conductive agent may be omitted.

The binder is blended to bind the positive electrode active material with the electro-conductive agent. Examples of the binder include polytetrafluoroethylene (PTFE), polyvinylidene fluoride (PVdF), fluorine-based rubbers, polyacrylonitrile, and polyethylene oxide. One of these may be used as the binder, or alternatively, two or more may be used in combination as the electro-conductive agent.

The proportions of the positive electrode active material, electro-conductive agent, and binder included in the positive electrode active material-containing layer are preferably adjusted respectively to 80% by mass or more and 95% by mass or less, 3% by mass or more and 18% by mass or less, and 1% by mass or more and 17% by weight or less. By having the amount of the electro-conductive agent adjusted to 3% by mass or more, the above-mentioned effects can be achieved. By having the amount of the electro-conductive agent adjusted to 18% by mass or less, decomposition of the electrolyte at the surface of the electro-conductive agent under high-temperature storage can be reduced. The by having the amount of the binder adjusted to 1% by mass or more, sufficient positive electrode strength can be provided. By having the amount of the binder adjusted to 17% by mass or less, the amount of the binder, which is an insulating material, blended in the positive electrode can be reduced, whereby the internal resistance can be reduced.

The positive electrode current collector is preferably an aluminum foil or an aluminum alloy foil containing one or more elements selected from Mg, Ti, Zn, Ni, Cr, Mn, Fe, Cu, and Si.

The thickness of the aluminum foil or aluminum alloy foil is preferably within a range from 5 μm to 20 μm, and is more preferably 15 μm or less. The purity of the aluminum foil is preferably 99% by mass or more. The content of transition metals such as iron, copper, nickel, and chromium contained in the aluminum foil or aluminum alloy foil is preferably 1% by mass or less.

In addition, the positive electrode current collector may include a portion where the surface thereof has no positive electrode active material-containing layer formed thereon. This portion can serve as a current collecting tab.

The positive electrode may be fabricated, for example, by the following method. First, the positive electrode active material, electro-conductive agent, and binder are suspended in a solvent to prepare a slurry. This slurry is applied onto one side or both sides of the positive electrode current collector. Next, the applied slurry is dried to obtain a stack of the positive electrode active material-containing layer and the current collector. Thereafter, the stack is pressed. The positive electrode is thus fabricated.

Alternatively, the positive electrode may be fabricated by the following method. First, the positive electrode active material, electro-conductive agent, and binder are mixed to obtain a mixture. The mixture is then formed into pellets. The positive electrode can be obtained by subsequently arranging these pellets on the positive electrode current collector.

(2) Negative Electrode

The negative electrode includes a niobium-titanium composite oxide as a negative electrode active material. The negative electrode may include a negative electrode active material-containing layer containing the negative electrode active material. The negative electrode may further include a negative electrode current collector.

The negative electrode active material-containing layer may be formed on one face or both the front and reverse faces of the negative electrode current collector. The negative electrode active material-containing layer may optionally contain an electro-conductive agent and a binder, in addition to the negative electrode active material.

The crystal structure of the niobium-titanium composite oxide may be, for example, monoclinic. When the negative electrode active material includes a monoclinic niobium-titanium composite oxide, high rate performance can be achieved in addition to an excellent energy density. The reason for this will be described by taking $Nb_2TiO_7$, which is a kind of monoclinic niobium-titanium composite oxide, as an example. The crystal structure of $Nb_2TiO_7$ has a large equivalent insertion space for lithium ions and is structurally stable. Furthermore, there are regions having a two-dimensional channel in which lithium ions diffuse rapidly and a conductive path in a [001] direction, connecting between the regions. As a result, in the crystal structure of the monoclinic niobium-titanium composite oxide $Nb_2TiO_7$, insertion/extraction property of the lithium ions into the insertion space is improved and an insertion/extraction space of the lithium ions is effectively increased. As a result, it is possible to provide high capacity and high rate performance.

An example of monoclinic niobium-titanium composite oxide includes a composite oxide represented by $Li_aTi_{1-b}M1_bNb_{2-c}M2_cO_{7+\delta}$. Here, M1 is at least one selected from the group consisting of Zr, Si, and Sn. M2 is at least one selected from the group consisting of V, Ta, and Bi. Each subscript in the composition formula are $0 \leq a \leq 5$, $0 \leq b < 1$, $0 \leq c < 2$, and $-0.3 \leq \delta \leq 0.3$. A specific example of the monoclinic niobium-titanium composite oxide is $Li_aNb_2TiO_7$ ($0 \leq a \leq 5$).

Another example of the monoclinic niobium-titanium composite oxide is a composite oxide represented by $Li_aTi_{1-b}M3_{b+c}Nb_{2-c}O_{7-\delta}$. Here, M3 is at least one selected from the group consisting of Mg, Fe, Ni, Co, W, Ta, and Mo. Each subscript in the composition formula are $0 \leq a \leq 5$, $0 \leq b < 1$, $0 \leq c < 2$, and $-0.3 \leq \delta \leq 0.3$.

Specific examples of the niobium-titanium composite oxides include $Nb_2TiO_7$, $Nb_2Ti_2O_9$, $Nb_{10}Ti_2O_{29}$, $Nb_{14}TiO_{37}$, and $Nb_{24}TiO_{62}$. The niobium-titanium composite oxide may be a substituted niobium-titanium composite oxide in which at least a part of Nb and/or Ti is substituted with a dopant. Examples of substitution elements are Na, K, Ca, Co, Ni, Si, P, V, Cr, Mo, Ta, Zr, Mn, Fe, Mg, B, Pb, and Al. The substituted niobium-titanium composite oxide may include one species or two or more species of the substitution elements.

The titanium-niobium composite oxide may include a titanium-niobium composite oxide having an orthorhombic crystal structure. An example of titanium-niobium composite oxide of the orthorhombic crystal structure includes a compound represented by $Li_{2+d}Na_{2-e}M4_fTi_{6-g-h}Nb_gM5_hO_{14+t}$. In general formula $Li_{2+d}Na_{2-e}M4_fTi_{6-g-h}Nb_gM5_hO_{14+\delta}$, subscript d is within a range of $0 \leq d \leq 4$, subscript e is within a range of $0 \leq e < 2$, subscript f is within a range of $0 \leq f < 2$, subscript g is within a range of $0 < g < 6$, subscript h is within a range of $0 \leq h < 3$, a sum of the subscript g and the subscript h is within a range of $0 < g+h < 6$, and subscript σ is within a range of $-0.5 \leq \sigma \leq 0.5$. Element M4 is at least one selected from the group consisting of Cs, K, Sr, Ba and Ca. Element M5 is at least one selected from the group consisting of Zr, Sn, V, Ta, Mo, W, Fe, Mn and Al.

In the niobium-titanium composite oxide, the elemental ratio between niobium and the other elements may deviate from the theoretical value with respect to the above-described composition formula or general formula. For example, the amount of niobium is preferably larger in comparison between the theoretical values of niobium and other elements. Thereby, niobium ions elute out from the negative electrode into the electrolyte during initial charge when adjusting the negative electrode potential, whereby uniform formation of a sulfur-containing coating on the negative electrode surface is promoted. Thus, there tends to be obtained a negative electrode with excellent high-temperature resistance.

The negative electrode active material may include one niobium-titanium composite oxide singly, or may include a combination of two or more of the above.

The negative electrode active material may further include other compounds in addition to the niobium-titanium composite oxide. Herein, for convenience, the niobium-titanium composite oxide is referred to as a first negative electrode active material, and another compound as negative electrode active material is referred to as a second negative electrode active material. The negative electrode active material may include one or more of the first negative electrode active materials and one second negative electrode active material in combination, or may include one or more of the first negative electrode active materials and two or more of second negative electrode active materials in combination. The negative electrode active material includes the first negative electrode active material (niobium-titanium composite oxide) in a proportion of, for example, 70% by mass or more, and preferably 90% by mass or more. The negative electrode active material may also include only the first negative electrode active material (niobium-titanium composite oxide).

Examples of the second negative electrode active material include lithium titanate having a ramsdellite structure (for example, $Li_{2+m}Ti_3O_7$, $0 \leq m \leq 3$), lithium titanate having a spinel structure (for example, $Li_{4+m}Ti_5O_{12}$, $0 \leq m \leq 3$), titanium dioxide ($TiO_2$), anatase titanium dioxide, rutile titanium dioxide, niobium pentoxide ($Nb_2O_5$), hollandite titanium composite oxide, and orthorhombic titanium composite oxides besides the above-mentioned titanium-niobium composite oxides of orthorhombic crystal structure.

Examples of the orthorhombic titanium composite oxide other than titanium-niobium composite oxides of orthorhombic crystal structure include a compound represented by $Li_{2+n}M6_{2-p}Ti_{6-q}M7_rO_{14+\delta}$. Here, M6 is at least one selected from the group consisting of Sr, Ba, Ca, Mg, Na, Cs, Rb, and K. M7 is at least one selected from the group consisting of Zr, Sn, V, Ta, Mo, W, Y, Fe, Co, Cr, Mn, Ni and Al. The respective subscripts in the composition formula are $0 \leq n \leq 6$, $0 \leq p < 2$, $0 \leq q < 6$, $0 \leq r < 6$, and $-0.5 \leq \sigma \leq 0.5$. Specific examples of the orthorhombic titanium-containing composite oxide include $Li_{2+n}Na_2Ti_6O_{14}$ ($0 \leq n \leq 6$).

The negative electrode active material is contained in the negative electrode active material-containing layer, for example, in the form of particles. The negative electrode active material particles may take the form of, for example, primary particles, or may take the form of agglomerated secondary particles. The negative electrode active material particles may be a mixture of primary particles and secondary particles.

The average particle diameter ($D_{50}$) of the negative electrode active material particles falls within, for example, the range of 0.1 μm to 50 μm. The average particle size may be changed depending on the required battery performance. For example, the average particle size is preferably adjusted to 5.0 μm or less in order to enhance the rapid charge-and-discharge performance. Thereby, the diffusion distance of lithium ions within the crystal can be reduced, whereby the rapid charge/discharge performance can be enhanced. The average particle diameter can be determined by, for example, a laser diffraction method. The average particle diameter means, for example, a median diameter $d_{50}$ determined by a laser diffraction scattering method.

Whether the negative electrode active material particles include secondary particles or primary particles can be determined by observation with a scanning electron microscope (SEM: Scanning Electron Microscopy). Furthermore, the average primary particle diameter and average secondary particle diameter of the active material particles can be measured by SEM observation.

The BET (Brunauer, Emmett, Teller) specific surface area of the negative electrode active material is not particularly limited. The BET specific surface area is, however, preferably 0.1 m²/g or more and 20 m²/g or less, more preferably 1 m²/g or more and 10 m²/g or less.

When the specific surface area is 0.1 m²/g or more, the contact area with the electrolyte can be secured, whereby favorable discharge rate performance is likely to be obtained, and the charging time can be shortened. On the other hand, when the specific surface area is 20 m²/g or less, the reactivity with the electrolyte is not excessively increased, and the life performance can be improved. Furthermore, the coatability of slurry containing the negative electrode active material, for use in the electrode production described later, can be made favorable.

The electro-conductive agent is added to improve current collection performance and to suppress the contact resistance between the active material and the current collector. Examples of the electro-conductive agent include carbonaceous substances such as vapor grown carbon fiber (VGCF), carbon blacks such as acetylene black, graphite, carbon nanotubes, and carbon nanofibers. One of these may be used as the electro-conductive agent, or alternatively, two or more may be used in combination as the electro-conductive agent. Alternatively, instead of using an electro-conductive agent, a carbon coating or an electro-conductive inorganic material coating may be applied to the surface of the active material particle. Moreover, the current collecting performance of the active material-containing layer can be enhanced by coating carbon or an electro-conductive material on the active material surface while using an electro-conductive agent.

The binder is added to fill gaps among the dispersed active material and also to bind the negative electrode active material with the negative electrode current collector. Examples of the binder include polytetrafluoroethylene (PTFE), polyvinylidene fluoride (PVdF), fluorine rubber, styrene-butadiene rubber, polyacrylate compounds, imide compounds, carboxymethyl cellulose (CMC), and salts of CMC. One of these may be used as the binder, or alternatively, two or more may be used in combination as the binder.

In the negative electrode active material-containing layer, the negative electrode active material, electro-conductive agent, and binder are preferably included in proportions, respectively of 70% by mass or more and 96% by mass or less, 2% by mass or more and 28% by mass or less, and 2% by mass or more and 28% by mass or less. By having the amount of the electro-conductive agent adjusted to 2% by mass or more, the current collecting performance of the negative electrode active material-containing layer can be improved, and the large current performance of the secondary battery can be improved. Furthermore, by having the amount of the binder adjusted to 2% by mass or more, the binding property between the negative electrode active material-containing layer and the current collector can be enhanced, thereby improving cycle performance. On the other hand, each of the electro-conductive agent and the binder are preferably included at 28% by mass or less, in view of achieving high capacity.

The density of the negative electrode active material-containing layer (excluding the current collector) is preferably 1.8 g/cm$^3$ or more and 3.5 g/cm$^3$ or less. The negative electrode in which the density of the negative electrode active material-containing layer falls within this range is excellent in energy density and electrolyte retention. The density of the negative electrode active material-containing layer is more preferably 2.1 g/cm$^3$ or more and 3.0 g/cm$^3$ or less.

Used for the negative electrode current collector is a material that is electrochemically stable at an electric potential at which lithium (Li) is inserted into and extracted from the negative electrode active material. The negative electrode current collector is preferably made from, for example, copper, nickel, stainless steel or aluminum, or an aluminum alloy containing one or more elements selected from Mg, Ti, Zn, Mn, Fe, Cu, and Si. The thickness of the negative electrode current collector is preferably 5 μm or more and 20 μm or less. The negative electrode current collector with such a thickness can be balanced between the strength and reduction in weight for the negative electrode.

In addition, the negative electrode current collector may include a portion where the surface thereof has no negative electrode active material-containing layer formed thereon. This portion can serve as a current collecting tab.

The negative electrode may be fabricated, for example, by the following method. First, the negative electrode active material, electro-conductive agent, and binder are suspended in a solvent to prepare a slurry. This slurry is applied onto one or both sides of the negative electrode current collector. Then, the applied slurry is dried to obtain a stack of the negative electrode active material-containing layer and the current collector. Thereafter, this stack is subjected to pressing. In this way, the negative electrode can be fabricated.

Alternatively, the negative electrode maybe fabricated by the following method. First, the negative active material particles, electro-conductive agent, and binder are mixed to obtain a mixture. The mixture is then formed into pellets. The negative electrode can be obtained by subsequently arranging these pellets on the negative electrode current collector.

(3) Electrolyte

As the electrolyte, for example, a liquid nonaqueous electrolyte or gel nonaqueous electrolyte may be used. The liquid nonaqueous electrolyte is prepared by dissolving an electrolyte salt as solute in a liquid solvent, such as an organic solvent. The concentration of electrolyte salt is preferably from 0.5 mol/L to 2.5 mol/L.

Examples of the electrolyte salt include lithium salts such as lithium perchlorate (LiClO$_4$), lithium hexafluorophosphate (LiPF$_6$), lithium tetrafluoroborate (LiBF$_4$), lithium hexafluoroarsenate (LiAsF$_6$), lithium trifluoromethanesulfonate (LiCF$_3$SO$_3$), and lithium bistrifluoromethylsulfonylimide (LiN(CF$_3$SO$_2$)$_2$), and mixtures thereof. The electrolyte salt is preferably resistant to oxidation even at a high potential, and most preferably LiPF6.

The solvent of the electrolyte at least contains one or more first organic solvents having a viscosity η of 1 cP or less. Examples of the first organic solvent include: linear carbonates such as diethyl carbonate (DEC), dimethyl carbonate (DMC), and methyl ethyl carbonate (MEC); propionic acid esters such as methyl propionate, ethyl propionate (EP), propyl propionate, and butyl propionate; cyclic ethers such as tetrahydrofuran (THF), 2-methyl tetrahydrofuran (2MeTHF), and dioxolane (DOX); linear ethers such as dimethoxy ethane (DME) and diethoxy ethane (DEE); and acetonitrile (AN). These first organic solvents can be used singly or as a mixed solvent. The first organic solvent preferably includes one or more selected from the group consisting of diethyl carbonate, methyl ethyl carbonate, and ethyl propionate. The viscosity (η) of methyl ethyl carbonate is 0.65 cP, and the viscosity of ethyl propionate is 0.533 cP.

The electrolyte may further include a second organic solvent having a viscosity η of more than 1 cP, in addition to the first organic solvent. Examples of the second organic solvent include: cyclic carbonates such as propylene carbonate (PC), ethylene carbonate (EC), and vinylene carbonate (VC); γ-butyrolactone (GBL); and sulfolane (SL). One of these second organic solvents may be included together with one or more of first organic solvents, or alternatively, two or more of these second organic solvents may be included in the electrolyte together with one or more first organic solvents. Propylene carbonate is preferably included as the second organic solvent. The viscosity (η) of propylene carbonate is 2.53.

The volumetric proportion of the first organic solvent in the electrolyte is preferably 10% or more. For example, the ratio of the first organic solvent to the total volume of the first organic solvent and the second organic solvent (volume of solvent of electrolyte) ([volume of first organic solvent]/[volume of first organic solvent+volume of second organic solvent]) is preferably 0.1 or more. The electrolyte containing the first organic solvent in a volume ratio of 10% or more has low viscosity as a whole. Therefore, a secondary battery having high low-temperature output performance can be produced.

The electrolyte may further contain a sultone compound. By including the sultone compound in the electrolyte, a film may be formed on the positive electrode and/or the negative electrode during pretreatment. Such a film covers at least a part of the surface of the active material of the electrode, whereby the surface of the active material can be modified, and the reaction between the active material and the electrolyte can be suppressed. As a result, gas generation can be suppressed, and excellent life performance can be exhibited in a high-temperature environment.

The concentration of the sultone compound in the electrolyte is preferably 0.1% by mass to 10% by mass, more preferably 0.5% by mass to 5% by mass, with respect to the electrolyte. In the secondary battery produced by the aspect in which the concentration falls within the preferred range, the effect of suppressing gas generation can be expressed, while inhibiting an increase in electrode resistance due to further production of excessive coating.

The sultone compound includes one or more selected from the group consisting of 1,3-propane sultone, 1,3-propene sultone, 1,4-butane sultone, and 2,4-butane sultone. The electrolyte may include may include one selected from the group consisting of these sultone compounds, or may include two or more in mixture.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, a room temperature molten salt (ionic melt) including lithium ions, a polymer solid electrolyte, an inorganic solid electrolyte, or the like may be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

(4) Separator

The separator may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred. This is because such a porous film melts at a fixed temperature and thus able to shut off current.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal container is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), prismatic, cylinder, coin, or button-shaped. The container member may be appropriately selected depending on battery size and use of the battery.

(6) Negative Electrode Terminal

The negative electrode terminal may be made of a material that is electrochemically stable at the potential at which Li is inserted into and extracted from the niobium-titanium composite oxide, and has electrical conductivity. Specific examples of the material for the negative electrode terminal include copper, nickel, stainless steel, aluminum, and aluminum alloy containing at least one selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance between the negative electrode terminal and the negative electrode current collector.

(7) Positive Electrode Terminal

The positive electrode terminal may be made of, for example, a material that is electrically stable in the potential range of 3 V to 4.5 V (vs. Li/Li+) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance between the positive electrode terminal and the positive electrode current collector.

<Powder X-Ray Diffraction>

The crystal structure of the compound included as active material can be examined by X-ray diffraction (XRD). For example, the crystal structures of the niobium-titanium composite oxide and other compounds included in the negative electrode active material, and the crystal structures of the lithium-nickel-cobalt-magnesium composite oxide and other compounds included in the positive electrode active material can be examined by powder X-ray diffraction measurements. As an apparatus for powder X-ray diffraction measurement, for example, SmartLab manufactured by Rigaku or an apparatus having equivalent functions is used. Measurement is performed under the following conditions:

X-ray source: Cu target
Output: 45 kV, 200 mA
soller slit: 5 degrees in both incident light and received light
step width (2θ): 0.02 deg
scan speed: 20 deg/min
semiconductor detector: D/teX Ultra 250
sample plate holder: flat glass sample plate holder (0.5 mm thick)
measurement range: $5° \leq 2\theta \leq 90°$ <Gas Chromatography—Mass Spectrometry and Viscosity Measurement>

The composition of the electrolyte and the components in the electrolyte can be quantified by gas chromatography-mass spectrometry (GC-MS) measurement. The viscosity of the solvent of the electrolyte can be measured by a rotary viscometer.

After the composition of the solvent is identified by GC-MS, a pure sample is prepared for each component, and the viscosity of each component can be known by subjecting each sample to measurement with a rotary viscometer. Combining GC-MS analysis and viscosity measurement as described above, the presence or absence of the first organic solvent and the content proportion of the first organic solvent in the electrolyte solvent can be examined by GC-MS.

Specifically, the measurement can be performed as follows. When the electrolyte to be measured is included in the battery architecture or the secondary battery, the battery container member is opened under an argon atmosphere, and the electrolyte is taken out. As necessary, the electrolytic solution is diluted with, for example, dehydrated acetonitrile and subjected to measurement by GC-MS. In GC-MS measurement, for example, UACW-30M-0.25F (inner diameter: 0.25 mm, length: 30 m, film thickness: 0.25 µm) manufactured by Frontier Laboratories Ltd. is used as a capillary column, and by holding at 60° C. for 10 minutes then heating to 200° C. at 10° C./min, a mass spectrum of each component separated from electrolyte can be obtained. The ionization method is not limited as long as measurement is capable, and for example, an electron ionization (EI) method may be used. The EI method is also referred to as electron impact ionization method. After the electrolyte components are identified by GC-MS, a single sample of each identified component is prepared, a calibration curve is created for each component, and each component can be quantified by comparing with the result of GC-MS. In addition, the viscosity value is obtained by preparing a singular sample of each component identified by GC-MS analysis of the electrolytic solution and by measurement with a rotary viscometer.

Next, the battery architecture used in the production method for a secondary battery according to the embodiment will be more specifically described with reference to the drawings.

Figure 2:
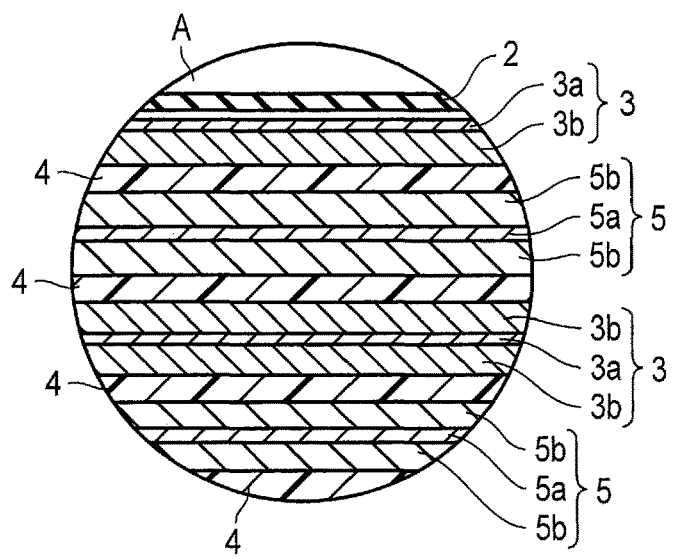
FIG. 2 is an enlarged cross-sectional view of section A of the battery architecture shown in FIG. 1.

FIG. 1 is a cross-sectional view schematically showing an example of a battery architecture according to the embodiment. FIG. 2 is an enlarged cross-sectional view of section A of the battery architecture shown in FIG. 1.

The battery architecture 100 shown in FIGS. 1 and 2 includes a bag-shaped container member 2 shown in FIG. 1, an electrode group 1 shown in FIGS. 1 and 2, and an electrolyte, which is not shown. The electrode group 1 and the electrolyte are housed in the bag-shaped container member 2. The electrolyte (not shown) is held in the electrode group 1.

The bag-shaped container member 2 is made of a laminate film including two resin layers and a metal layer sandwiched between the resin layers.

As shown in FIG. 1, the electrode group 1 is a wound electrode group in a flat form. The wound electrode group 1 in a flat form includes a negative electrode 3, a separator 4, and a positive electrode 5, as shown in FIG. 2. The separator 4 is sandwiched between the negative electrode 3 and the positive electrode 5.

The negative electrode 3 includes a negative electrode current collector 3a and a negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 2. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 1, a negative electrode terminal 6 and positive electrode terminal 7 are positioned in vicinity of the outer peripheral edge of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2.

A thermoplastic resin layer is provided on the inner surface of a bag-shaped container member 2, and is thermally fused to close the opening of the bag-shaped container member 2. For either of the temporary sealing before the treatment of holding the battery architecture 100 in the state where the electrode potential is adjusted, and the full sealing after the treatment and degassing, the opening of the bag-shaped container member 2 is closed, for example, by thermal fusion. The position where thermal fusion is performed during temporary sealing is, for example, a position closer to the opening end portion than the position where thermal fusion is performed in the full sealing.

A liquid electrolyte may be injected, for example, from the opening of the bag-shaped container member 2 before temporary sealing. For example, the opening of the bag-shaped container member 2 is closed by thermal fusion with a part left, and the liquid electrolyte is injected through the part left without thermal fusion. Then, the portion into which the electrolyte is injected is closed by thermal fusion and temporarily sealed.

Figure 3:
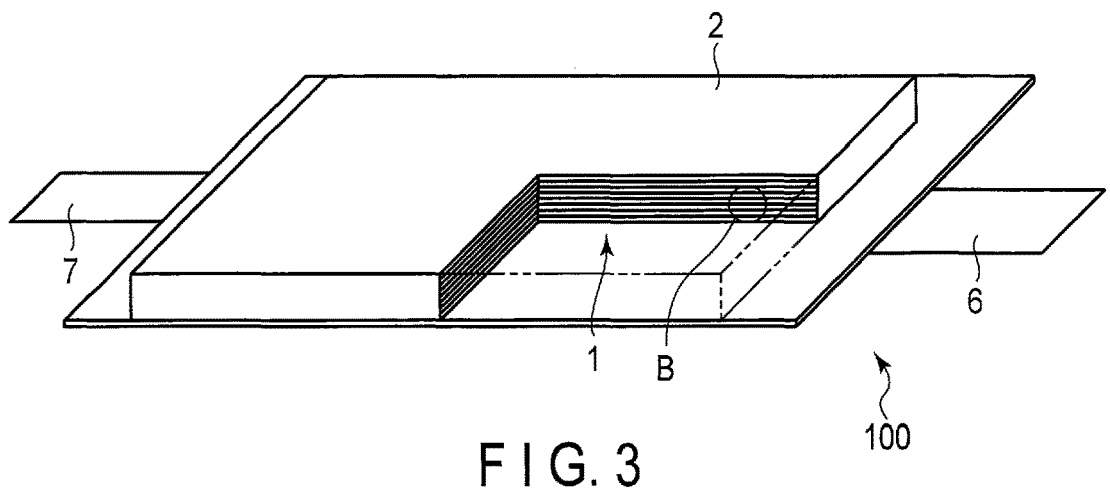
FIG. 3 is a partially cutaway perspective view schematically illustrating another example of the battery architecture according to the embodiment.
Figure 4:
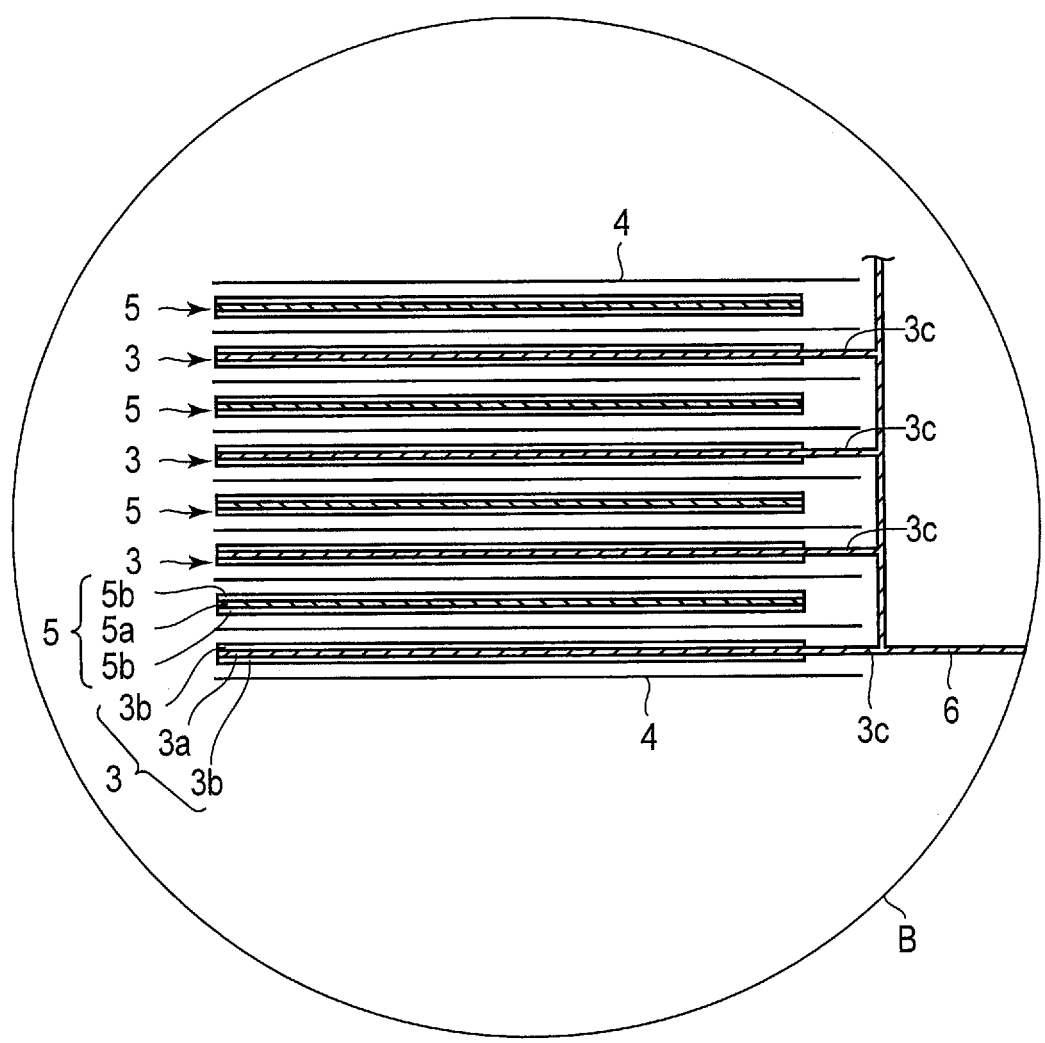
FIG. 4 is an enlarged cross-sectional view of section B of the battery architecture shown in FIG. 3.

The battery architecture according to the embodiment is not limited to the battery architecture of the configuration shown in FIGS. 1 and 2, and may be, for example, a battery of a structure as shown in FIGS. 3 and 4.

FIG. 3 is a partially cut-out perspective view schematically showing another example of a battery architecture according to the embodiment. FIG. 4 is an enlarged cross-sectional view of section B of the battery architecture shown in FIG. 3.

The battery architecture 100 shown in FIGS. 3 and 4 includes an electrode group 1 shown in FIGS. 3 and 4, a container member 2 shown in FIG. 3, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 4, the electrode group 1 is a stacked electrode group. The stacked electrode group 1 has a structure in which negative electrodes 3 and positive electrodes 5 are alternately stacked with separator(s) 4 sandwiched therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at one end, a portion 3c where the negative electrode active material-containing layer 3b is not supported on either surface. This portion 3c serves as a negative electrode tab. As shown in FIG. 4, the portions 3c serving as the negative electrode tabs do not overlap the positive electrodes 5. The plural negative electrode tabs (portions 3c) are electrically connected to the strip-shaped negative electrode terminal 6. A tip of the strip-shaped negative electrode terminal 6 is drawn to the outside from the container member 2.

Although not shown, the positive electrode current collector 5a of each of the positive electrodes 5 includes at one end, a portion where the positive electrode active material-containing layer 5b is not supported on either surface. This portion serves as a positive electrode tab. Like the negative electrode tabs (portion 3c), the positive electrode tabs do not overlap the negative electrodes 3. Further, the positive electrode tabs are located on the opposite side of the electrode group 1 with respect to the negative electrode tabs (portion 3c). The positive electrode tabs are electrically connected to the strip-shaped positive electrode terminal 7. A tip of the strip-shaped positive electrode terminal 7 is located on the opposite side relative to the negative electrode terminal 6 and drawn to the outside from the container member 2.

Figure 5:
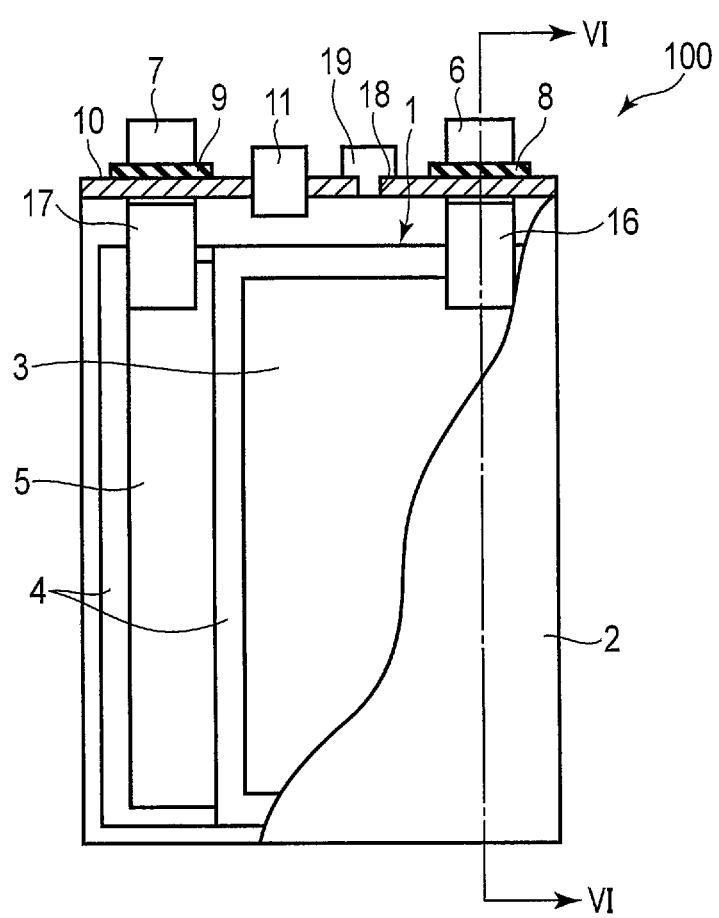
FIG. 5 is a cross-sectional view schematically illustrating yet another example of the battery architecture according to the embodiment.

Yet another example of the battery architecture is explained with reference to FIGS. 5 and 6. FIG. 5 is a cross-sectional view schematically illustrating yet another example of the battery architecture according to the embodiment. FIG. 6 is a schematic cross-sectional view along a line VI-VI of shown in FIG. 5 of the battery architecture.

An electrode group 1 is housed in a container member 2 made of a rectangular tubular metal container. The electrode group 1 includes a negative electrode 3, a separator 4, and a positive electrode 5. The electrode group 1 has a structure formed by interposing the separator 4 between the positive electrode 5 and the negative electrode 3, and spirally winding so as to form a flat shape. An electrolyte (not shown) is held in the electrode group 1. As shown in FIG. 5, a strip-shaped negative electrode lead 16 is electrically connected to each of plural portions at an end of the negative electrode 3 located on an end face of the electrode group 1. In addition, a strip-shaped positive electrode lead 17 is electrically connected to each of plural portions at an end of the positive electrode 5 located on the end face. The plural negative electrode leads 16 are electrically connected to a negative electrode terminal 6 in a bundled state, as shown in FIG. 6. In addition, the plural positive electrode leads 17 are similarly electrically connected to a positive electrode terminal 7 in a bundled state, although not shown.

A sealing plate 10 made of metal is fixed to the opening portion of the container member 2 made of metal by welding or the like. The negative electrode terminal 6 and the positive electrode terminal 7 are extracted to the outside from outlets provided on the sealing plate 10, respectively. On the inner surfaces of each outlet of the sealing plate 10, a negative electrode gasket 8 and a positive electrode gasket 9 are arranged to avoid a short circuit caused by contact respective with the negative electrode terminal 6 and the positive electrode terminal 7. By providing the negative electrode gasket 8 and the positive electrode gasket 9, the airtightness of the secondary battery can be maintained.

A control valve 11 (safety valve) is provided on the sealing plate 10. When the internal pressure of the battery cell is raised by gas generated within the secondary battery, the generated gas can be released from the control valve 11 to the outside. In FIG. 5, the control valve 11 is disposed at the center of the sealing plate 10. However, the position of the control valve 11 may be an end of the sealing plate 10. The control valve 11 may be omitted.

Additionally, an inlet 18 is provided on the sealing plate 10. The electrolyte may be put in via the inlet 18. The inlet 18 may be closed with a sealing plug 19 after the electrolyte is put in. The inlet 18 and the sealing plug 19 may be omitted. When implementing the temporary sealing before performing the treatment of holding the battery architecture 100 at the holding temperature in the state with the electrode potentials adjusted, for example, a sealing plug 19 made of rubber may be used. When implementing the full sealing after the treatment and degassing, for example, a sealing plug 19 made of the same material as the sealing plate 10 is used and welded onto the sealing plate 10 in a state with the inlet 18 closed.

The production method for a secondary battery according to a first embodiment includes holding a battery architecture that includes a positive electrode, a negative electrode, and an electrolyte in a potential adjusted state where a positive electrode potential is adjusted to be within a range of 3.4 V to 3.9 V relative to the oxidation-reduction potential of lithium, while the negative electrode potential is adjusted to be within a range of 1.5 V to 2.0 V relative to the oxidation-reduction potential of lithium. The positive electrode includes a lithium-nickel-cobalt-manganese composite oxide. The negative electrode includes a niobium-titanium composite oxide. The electrolyte includes one or more first organic solvent having a viscosity of 1 cP or less. The battery architecture is held in the potential adjusted state at a holding temperature within a range of 50° C. to 90° C. The production method can produce a secondary battery that exhibits high output performance and for which gas generation is little even when charge-and-discharge cycles are repeated.

Second Embodiment

According to a second embodiment, a secondary battery is provided. The secondary battery is a secondary battery produced by the production method according to the first embodiment.

That is, the secondary battery according to the second embodiment is a secondary battery obtained by performing the above pretreatment on the battery architecture in the production method according to the first embodiment. Therefore, the secondary battery may be, for example, a nonaqueous electrolyte secondary battery or a lithium ion nonaqueous electrolyte secondary battery.

As compared with the battery architecture as a secondary battery precursor before the electrode potential adjustment as described in the first embodiment, the details of the secondary battery according to the second embodiment are the same as those of the battery architecture described in the first embodiment, except that the secondary battery is in a state of a finished product after pretreatment and accompanying degassing and full sealing. That is, the secondary battery according to the second embodiment includes the positive electrode, the negative electrode, and the electrolyte described in the first embodiment. In addition, the secondary battery according to the second embodiment may include the separator, the container member, the positive electrode terminal, and the negative electrode terminal described in the first embodiment. Since details overlap, description thereof is omitted.

However, in the secondary battery according to the second embodiment, components that may contribute to gas generation such as residual moisture can be in a reduced state as compared with the battery architecture before being subjected to pretreatment. In addition, the battery architecture before the pretreatment does not have a film on the electrode surface; however, in the secondary battery, the positive and negative electrodes may have a film on the surface. Moreover, the battery architecture before the pretreatment may be in a temporarily sealed state, whilst the secondary battery is in a fully sealed state.

The secondary battery according to the second embodiment is produced by the method of producing a secondary battery according to the first embodiment. Therefore, such a secondary battery can exhibit high output performance, and gas generation is little even when charge-and-discharge cycles are repeated.

EXAMPLES

Examples will be described below; however, the embodiments are not limited to the examples described below.

Example 1

<Fabrication of Positive Electrode>

100 parts by mass of lithium-nickel-cobalt-manganese composite oxide $LiNi_{0.5}Co_{0.3}Mn_{0.2}O_2$ (NCM532) as a positive electrode active material, 5 parts by mass of acetylene black as an electro-conductive agent, and 5 parts by mass of polyvinylidene fluoride (PVdF) as a binder were added to N-methylpyrrolidone (NMP), and mixed to prepare a slurry. This slurry was applied onto both surfaces of a current collector including an aluminum foil having a thickness of 12 μm, then dried and pressed to thereby prepare a positive electrode having an electrode density (excluding the current collector) of 3.2 g/cm$^3$.

<Fabrication of Negative Electrode>

100 parts by mass of a monoclinic niobium-titanium composite oxide $Nb_2TiO_7$ as a negative electrode active material, 8 parts by mass of acetylene black as an electro-conductive agent, and 8 parts by mass of PVdF as a binder were added to NMP and mixed to prepare a slurry. This slurry was applied onto one surface of a current collector including an aluminum foil having a thickness of 12 μm, then dried and pressed to thereby prepare a negative electrode having an electrode density (excluding the current collector) of 2.6 g/cm$^3$.

<Fabrication of Electrode Group>

The positive electrode prepared as described above, a separator made of cellulose and having a thickness of 15 μm, the negative electrode prepared as described above, and the separator were stacked in this order, and then wound in a spiral shape so that the negative electrode was located outermost to thereby prepare an electrode group. This was hot-pressed at 90° C. to produce a flat electrode group having a width of 58 mm and a thickness of 3.0 mm. The obtained electrode group was housed in a container member made of a laminate film having a thickness of 0.1 mm, which included an aluminum foil having a thickness of 40 μm and polypropylene layers formed on both surfaces of the aluminum foil, and vacuum-dried at 120° C. for 24 hours.

<Addition of Nonaqueous Electrolyte>

Propylene carbonate (PC), methyl ethyl carbonate (MEC), and ethyl propionate (EP) were mixed at a volume ratio of 1:1:1 under an argon atmosphere (volume ratio of first solvent (MEC+EP):66.7%) to prepare a mixed solvent. Lithium hexafluorophosphate ($LiPF_6$) was dissolved in the mixed solvent at a concentration of 1.0 mol/L. 1,3-propane sultone (PS) was further added thereto so as to be 1% by mass with respect to the entire solution to prepare a liquid nonaqueous electrolyte (electrolytic solution).

The electrolytic solution thus prepared was put into the electrode group housed in the dried laminate film, under an argon atmosphere. Then, the upper part of the laminate film was sealed under reduced pressure to provide a temporarily sealed secondary battery (battery architecture).

<Aging>

The temporarily sealed secondary battery was charged to a battery voltage of 1.8 V at room temperature (25° C.) (SOC 10%) to adjust the positive electrode potential to 3.65 V (vs. Li/Li+) and the negative electrode potential to 1.85 V (vs. Li/Li+). The temporarily sealed secondary battery thus brought into the potential adjusted state was heated in a thermostatic bath at a temperature of 80° C. (holding temperature, that is, aging temperature) for 24 hours (holding time, that is, aging time).

<Degassing>

After the heating, an upper portion of the temporarily sealed laminate pack was opened in an argon atmosphere. Thereafter, the pressure was reduced to discharge the gas, and the laminate film was sealed (full sealing) to provide a secondary battery.

Examples 2 to 11 and Comparative Examples 1 to 5

A secondary battery was produced in the same manner as in Example 1, except that the composition of the electrolyte and the pretreatment conditions were changed as shown in Tables 1 and 2 below. For the composition of the electrolyte, the composition of the electrolyte solvent, and the material species and addition amount of the sultone compound were changed as shown in Tables 1 and 2. For the pretreatment conditions, the positive electrode potential and the negative electrode potential adjusted to obtain a potential adjusted state, and the aging temperature and time (holding temperature and holding time) were changed.

TABLE 1

| | Electrolyte solvent Composition/ proportional content (volume ratio) | sultone compound Composition/ added amount | Potential adjusted state | | Aging | |
| --- | --- | --- | --- | --- | --- | --- |
| | | | Positive electrode potential (V vs. Li/Li$^+$) | Negative electrode potential (V vs. Li/Li$^+$) | Temperature (° C.) | Time (Hr) |
| Example 1 | PC:MEC:EP/ 1:1:1 | 1,3-propane sultone/ 1% by mass | 3.65 | 1.85 | 80 | 24 |

TABLE 1-continued

| | Electrolyte solvent Composition/ proportional content (volume ratio) | sultone compound Composition/ added amount | Potential adjusted state Positive electrode potential (V vs. Li/Li$^+$) | Potential adjusted state Negative electrode potential (V vs. Li/Li$^+$) | Aging Temperature (° C.) | Aging Time (Hr) |
|---|---|---|---|---|---|---|
| Example 2 | PC:MEC:EP/ 1:0:4 | 1,3-propane sultone/ 1% by mass | 3.65 | 1.85 | 80 | 24 |
| Example 3 | PC:MEC:EP/ 1:2:0 | 1,3-propane sultone/ 1% by mass | 3.65 | 1.85 | 80 | 24 |
| Example 4 | PC:MEC:EP/ 1:1:1 | 1,3-propane sultone/ 0.5% by mass | 3.65 | 1.85 | 80 | 24 |
| Example 5 | PC:MEC:EP/ 1:1:1 | 1,3-propane sultone/ 3% by mass | 3.65 | 1.85 | 80 | 24 |
| Example 6 | PC:MEC:EP/ 1:1:1 | 1,3-propane sultone/ 1% by mass | 3.875 | 1.625 | 80 | 24 |
| Example 7 | PC:MEC:EP/ 1:1:1 | 1,3-propane sultone/ 1% by mass | 3.65 | 1.85 | 60 | 24 |
| Example 8 | PC:MEC:EP/ 1:1:1 | 1,3-propane sultone/ 1% by mass | 3.65 | 1.85 | 80 | 6 |
| Example 9 | PC:MEC:EP/ 1:1:1 | 1,3-propene sultone/ 1% by mass | 3.65 | 1.85 | 80 | 24 |
| Example 10 | PC:DEC:EP/ 1:1:1 | 1,3-propane sultone/ 1% by mass | 3.65 | 1.85 | 80 | 24 |
| Example 11 | PC:MEC:EP/ 1:1:1 | 1,3-propane sultone/ 1% by mass | 3.65 | 1.85 | 80 | 72 |

TABLE 2

| | Electrolyte solvent Composition/ proportional content (volume ratio) | sultone compound Composition/ added amount | Potential adjusted state Positive electrode potential (V vs. Li/Li$^+$) | Potential adjusted state Negative electrode potential (V vs. Li/Li$^+$) | Aging Temperature (° C.) | Aging Time (Hr) |
|---|---|---|---|---|---|---|
| Comparative Example 1 | PC:MEC:EP/ 1:0:0 | 1,3-propane sultone/ 1% by mass | 3.65 | 1.85 | 80 | 24 |
| Comparative Example 2 | PC:MEC:EP/ 1:1:1 | 1,3-propane sultone/ 1% by mass | 4.2 | 1.3 | 80 | 24 |
| Comparative Example 3 | PC:MEC:EP/ 1:1:1 | 1,3-propane sultone/ 1% by mass | 3.65 | 1.85 | 100 | 24 |
| Comparative Example 4 | PC:MEC:EP/ 1:1:1 | 1,3-propane sultone/ 1% by mass | 3.65 | 1.85 | 30 | 24 |

[Evaluation]
<Output Performance Evaluation>

The internal resistance of the secondary battery produced in each of the Examples and Comparative Examples was measured. A lower internal resistance indicates that a higher output performance can be provided.

Under a temperature environment of 25° C., each secondary battery was charged at a charge rate of 1 C (a current value at which SOC reached 0% in 1 hour when the battery was discharged from SOC 100%) in a constant-current constant-voltage mode until SOC reached 100%, and discharged at a discharge rate of 1 C until SOC reached 50% to adjust a depth of discharge (DOD) to 50%. Thereafter, the battery was discharged at 10 C for 10 seconds, and the internal resistance (resistance value) was determined from the voltage change and the current value during the 10 seconds.

<Cycle Performance Evaluation>

Each secondary battery was subjected to 1000 cycles of charge-and-discharge at 70° C. within a capacity range such that SOC was from 30% to 80%, and the amount of gas generated was measured.

Before performing 1000 cycles of charge-and-discharge, the secondary battery adjusted to DOD 50% through the same procedure as described above was submerged in a rectangular parallelepiped graduated container including water, and the volume was read from the positional change of the water surface. This volume was defined as $V_A$ [cm$^3$].

Then, the secondary battery was drawn out from the water. The drawn-out secondary battery was subjected to 1000 cycles of charge-and-discharge in an environment at 70° C. within a SOC range of 30% to 80%.

The battery after finishing the charge-and-discharge cycles was submerged in the rectangular parallelepiped graduated container including water, and the volume was read from the position change of the water surface. This volume was defined as $V_B$ [cm$^3$].

Then, the amount of gas generated in each secondary battery was calculated by subtracting the volume $V_A$ from the volume $V_B$.

The evaluation results of each secondary battery are shown in Table 3 below. Specifically, the internal resistance at SOC 50% and the amount of gas generated during the 1000 cycles of charge-and-discharge are summarized in the table.

TABLE 3

| | Internal resistance at SOC 50% (mΩ) | Amount of Gas generated during 1000 cycles of charge-and-discharge (cm³) |
|---|---|---|
| Example 1 | 15.31 | 0.56 |
| Example 2 | 15.02 | 0.48 |
| Example 3 | 15.40 | 0.58 |
| Example 4 | 14.50 | 0.67 |
| Example 5 | 17.51 | 0.12 |
| Example 6 | 18.24 | 0.78 |
| Example 7 | 15.15 | 0.80 |
| Example 8 | 15.03 | 0.66 |
| Example 9 | 15.45 | 0.86 |
| Example 10 | 16.09 | 0.34 |
| Example 11 | 16.31 | 0.29 |
| Comparative Example 1 | 30.89 | 0.40 |
| Comparative Example 2 | 18.76 | 5.82 |
| Comparative Example 3 | 17.66 | 3.08 |
| Comparative Example 4 | 15.38 | 2.21 |

In all of the secondary batteries produced in Examples 1 to 11, the internal resistance was low, and the amount of gas generated during the charge-and-discharge cycles was suppressed to be low. Whereas, the internal resistance of the secondary battery produced in Comparative Example 1 was significantly high, and the amount of gas generated was significantly large in the secondary batteries produced in Comparative Examples 2 to 5.

In Comparative Example 1, only propylene carbonate (PC) was used as a solvent of the electrolyte. In Comparative Example 1, the first organic solvent having a viscosity η of 1 cP or less was not included, and therefore the output performance had not improved.

In Comparative Example 2, when adjusting to the potential adjusted state, the positive electrode potential was more than 3.9 V (vs. Li/Li+), and the negative electrode potential was less than 1.5 V (vs. Li/Li+). That is, in Comparative Example 2, aging was performed at a relatively high SOC. In Comparative Example 3, aging was performed at a holding temperature exceeding 90° C. In Comparative Examples 2 and 3, it is considered that decomposition of the electrolyte component due to inappropriate aging conditions increased the amount of gas generated during the charge-and-discharge cycles at high temperature.

In Comparative Example 4, aging was performed at a holding temperature below 50° C. In Comparative Example 4, it is considered that as a result of insufficiently effective pretreatment, the amount of gas generated during the charge-and-discharge cycle at high temperature had increased.

As shown by the evaluation results of the secondary batteries produced in each of Examples, the secondary battery having high output performance and suppressed gas generation in repeated charge-and-discharge cycles can be produced by the production method described in the first embodiment.

According to at least one embodiment and example described above, a method for producing a secondary battery is provided. The method includes a step of preparing a battery architecture including a positive electrode that includes a lithium-nickel-cobalt-manganese composite oxide, a negative electrode that includes a niobium-titanium composite oxide, and an electrolyte that includes one or more first organic solvent having a viscosity of 1 cP or less; a step of providing a potential adjusted state by adjusting a positive electrode potential while adjusting a negative electrode potential; and a step of holding the battery architecture in the potential adjusted state at a holding temperature of 50° C. to 90° C. In the step of providing the potential adjusted state, the positive electrode is adjusted to a potential of 3.4 V (vs. Li/Li+) to 3.9 V (vs. Li/Li+) with respect to an oxidation-reduction potential of lithium as standard, and the negative electrode is adjusted to a potential of 1.5 V (vs. Li/Li+) to 2.0 V (vs. Li/Li+) with respect to an oxidation-reduction potential of lithium as standard. According to the above, a method for producing a secondary battery that exhibits high output performance, for which there is little gas generation even when charge-and-discharge cycles are repeated, and this secondary battery are provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of producing a secondary battery, the method comprising:
    preparing a battery architecture, the battery architecture comprising a positive electrode, a negative electrode, and an electrolyte, the positive electrode comprising a lithium-nickel-cobalt-manganese composite oxide, the negative electrode comprising a niobium-titanium composite oxide, and the electrolyte comprising one or more of first organic solvents having a viscosity of 1 cP or less;
    adjusting a positive electrode potential of the positive electrode to a range of 3.4 V or more and 3.9 V or less based on oxidation-reduction potential of lithium, and adjusting a negative electrode potential of the negative electrode to a range of 1.5 V or more and 2.0 V or less based on oxidation-reduction potential of lithium, thereby providing a potential adjusted state; and
    holding the battery architecture in the potential adjusted state at a holding temperature in a range of 50° C. or more and 90° C. or less.

2. The method of producing a secondary battery according to claim 1, wherein the battery architecture is held in the potential adjusted state at the holding temperature for 6 hours or more and 72 hours or less.

3. The method of producing a secondary battery according to claim 1, wherein the electrolyte comprises the first organic solvent in a volume ratio of 10% or more.

4. The method of producing a secondary battery according to claim 1, wherein the first organic solvent comprises one or more selected from the group consisting of diethyl carbonate, methyl ethyl carbonate, and ethyl propionate.

5. The method of producing a secondary battery according to claim 1, wherein the electrolyte comprises a second organic solvent comprising propylene carbonate.

6. The method of producing a secondary battery according to claim 1, wherein the electrolyte further comprises a sultone compound.

7. The method of producing a secondary battery according to claim 6, wherein the sultone compound comprises one or more selected from the group consisting of 1,3-propane sultone, 1,3-propene sultone, 1,4-butane sultone, and 2,4-butane sultone.

8. The method of producing a secondary battery according to claim 1, wherein the lithium-nickel-cobalt-manganese composite oxide comprises a compound represented by $Li_xNi_{1-y-z}Co_yMn_zO_2$ wherein $0<x\le1$, $0<y<1$, $0<z<1$, and $y+z<1$.

9. The method of producing a secondary battery according to claim 1, wherein the niobium-titanium composite oxide includes one or more of monoclinic niobium-titanium composite oxides selected from the group consisting of: a compound represented by $Li_aTi_{1-b}M1_bNb_{2-c}M2_cO_{7+\delta}$, wherein M1 is at least one selected from the group consisting of Zr, Si, and Sn, M2 is at least one selected from the group consisting of V, Ta, and Bi, $0\le a\le5$, $0\le b<1$, $0\le c<2$, and $-0.3\le\delta\le0.3$; and a compound represented by $Li_aTi_{1-b}M3_{b+c}Nb_{2-c}O_{7-\delta}$, wherein M3 is at least one selected from the group consisting of Mg, Fe, Ni, Co, W, Ta, and Mo, $0\le a\le5$, $0\le b<1$, $0\le c<2$, and $-0.3\le\delta\le0.3$.

10. A secondary battery produced by the method according to claim 1.

* * * * *